3,845,015
HIGH PERFORMANCE POLYSULFONATE RESIN
Robert J. Thomas, Midland, Mich., assignor to The
   Dow Chemical Company, Midland, Mich.
No Drawing. Filed Oct. 31, 1973, Ser. No. 411,492
            Int. Cl. C08g 17/08, 17/13
U.S. Cl. 260—49                                5 Claims

ABSTRACT OF THE DISCLOSURE

Polysulfonate resins based ultimately on diphenyl ether and an alkylidenebisphenol such as Bisphenol A show good thermal properties and lack the brittleness characteristic of many known polysulfonates. End capping with phenol provides resins with melt flow properties suitable for injection molding.

BACKGROUND OF THE INVENTION

The present invention pertains to novel thermoplastic resins having superior physical properties. More particularly, the invention concerns new aromatic polysulfonate polymers.

Sulfonate polyester resins, and specifically aromatic polysulfonates, have been studied by various investigators and have been found to have many interesting and promising characteristics including relatively high resistance to oxidation and hydrolysis, thermal stability, hardness, and the like. These polysulfonates have usually been made by reacting aromatic disulfonyl chlorides such as benzenedisulfonyl chloride or biphenylenedisulfonyl chloride with a diphenol such as resorcinol, Bisphenol A, biphenol, or other such dihydroxy aromatic using one of two main reaction techniques. However, many prior known all polysulfonate polyester resins have been found to be brittle and capable only of compression molding, see particularly Schlott et al., Advan. Chem. Series, No. 91, pp. 703–716 (1969) and Work et al., J. Polymer Science 6 (A–1) 2022–30 (1968). To avoid these disadvantages and to obtain more amorphous and less brittle resins, copolyesters which are mixed polysulfonates and polycarboxylates have been made by reacting both disulfonyl chlorides and dicarboxylic acid chlorides with dihydroxyaromatics. Mixed polyesters of this type are described by Schlott et al., U.S. 3,401,148 and Conix et al., U.S. 3,505,289.

SUMMARY OF THE INVENTION

Polyester resins wherein all of the ester linkages are sulfonate linkages have now been found which have properties comparable to or superior to the properties of mixed sulfonate-carboxylate polyesters and polycarbonates. These aromatic polysulfonates consist essentially of repeating units which have the formula

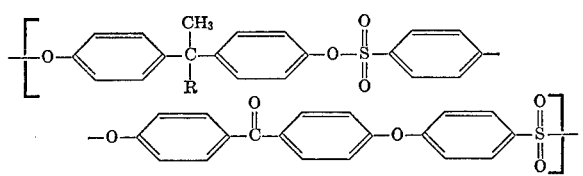

wherein R is an alkyl radical of 1–6 carbon atoms.

Apparently, the combination of the sulfonate linkages with the carbonyl and aromatic ether linkages provides the improved toughness and flexibility not found with previously known polysulfonates which lack one or both of the latter linking radicals.

DETAILED DESCRIPTION

Preferably, R in the above formula represents a methyl group whereupon the polymer is a polyester of Bisphenol A or p,p′-isopropylidenediphenol. The corresponding polymers derived from other bisphenols where R is ethyl, isopropyl, tert-butyl or isoamyl, for example, have closely similar properties.

The polysulfonate resins of the present invention can be made by any convenient combination of known reactions. Two general types of preparation are particularly suited to the production of resins of good quality, a reaction of the disulfonyl chloride with the bisphenol in a homogeneous organic solvent solution and an interfacial reaction between these reactants in a two phase solvent system. Generally, similar polymers are obtained by these methods.

The homogeneous solution method is described by the Schlott references previously cited and it is shown in Example 1 below. In this method, about equal molar proportions of the bisphenol and the carbonylbis(phenyleneoxybenzenesulfonyl chloride) are dissolved in a convenient organic solvent, preferably a low boiling halogenated hydrocarbon such as methylene chloride, carbon tetrachloride, or methylchloroform. To this solution there is added a strongly basic tertiary amine, triethylamine for example, to act as an acid acceptor. The reaction can be carried out at a moderate temperature up to about the boiling point of the organic solvent. The polymer product can be separated in purified form by neutralizing any excess amine with aqueous acid, washing the solvent layer with water, and precipitating the dissolved polymer by pouring the solvent solution into excess lower alkanol. The polymer can be redissolved and the washing and precipitation steps repeated to obtain a highly purified polymer.

In the interfacial reaction technique as described by Conix et al. and shown in Example 2 hereof, an aqueous alkali solution of the bisphenol is reacted with a water-immiscible solvent solution of the disulfonyl chloride. Vigorous agitation is required to obtain efficient reaction. The solvent layer and any precipitated polymer can be washed free of contaminants and a purified polymer isolated by the general procedure described for the solvent solution reaction.

In either method of preparation, a polymer of controlled molecular weight and molecular weight distribution and having melt flow properties more suitable for extrusion molding is obtained by endcapping the polymer chains with the residue of a monohydric phenol. This is accomplished by including in the bisphenol reaction solution a minor amount, preferably about 0.1–3 mole percent of a monohydric phenol based on the bisphenol. Phenol, p-tert-butylphenol, and p-phenylphenol are suitable monohydric phenols for this purpose.

The polymeric products of the invention are white solids which soften at about 150–160° C. and which are soluble in or are attacked by many nonpolar organic solvents. When purified as described, they can be molded by compression or extrusion into tough, clear films and shaped objects. Conventional plasticizers, stabilizers, and fillers can be added to modify the color and other properties as desired.

EXAMPLE 1

A mixture of 24.1 g. of AlCl$_3$ and 90 ml. of diphenyl ether was heated to 60° C. and gaseous phosgene was bubbled in slowly at that temperature for 5.5 hours at which time the reaction appeared to be substantially complete. Nitrogen was then bubbled through the viscous reaction mixture for 15 minutes, 200 ml. of water was added, and the mixture was stirred for 30 minutes. The organic portion was washed several times with water and with aqueous methanol to obtain 61.6 g. of white solid, m.p. 147–149° C. This was identified by infrared examination as the expected 4,4'-diphenoxybenzophenone.

A solution of 3.66 g. (0.01 g. mole) of this product in 40 ml. of methylene chloride was cooled to 0° C. and 11.65 g. (0.1 g. mole) of chlorosulfonic acid was added dropwise, then the resulting mixture was stirred overnight at room temperature. The reaction mixture was poured over ice and the organic liquid layer plus some precipitated white powder was washed several times with water, then was evaporated to dryness to obtain 3.6 g. of off-white solid. This was decolorized by treating a methylene chloride solution with activated charcoal. The purified white solid product had a melting point of 170–174° C. and was identified by nuclear magnetic resonance measurements as the expected 4,4'-carbonylbis(p-phenyleneoxybenzenesulfonyl chloride).

A solution of 11.26 g. of the disulfonyl chloride and 4.56 g. of p,p'-isopropylidenediphenol in 75 ml. of methylene chloride was stirred at room temperature while 4.85 g. of triethylamine was added dropwise. The mixture was heated at reflux temperature for one hour after the addition was complete. The reaction was quenched by adding 100 ml. of 1% aqueous HCl and stirring for a few minutes, then the two phases were allowed to separate and the water layer was decanted. The organic layer was washed with water until the wash tested chloride free. The polymer was precipitated by adding the washed solution to excess methanol, the precipitate was washed with methanol, then was redissolved in methylene chloride and the above procedure was repeated. After vacuum drying the reprecipitated and washed polymer at 100° C., the purified material was found to soften at about 160° C. Its inherent viscosity (0.10 g. in 25 ml. trichloroethylene at 25° C.) was 0.82. A disc molded at 225° C. was clear, flexible, and tough.

EXAMPLE 2

A solution of 4.56 g. of p,p'-isopropylidenediphenol in 41 ml. of 1.0 N NaOH was added in 10 min. to a solution of 11.26 g. 4,4'-carbonylbis(p-phenyleneoxybenzenesulfonyl chloride) and 0.1 g. of triethylbenzylammonium chloride in 50 ml. of methylene chloride at room temperature with vigorous stirring. The vigorous stirring was continued after the addition was completed and a white, rubbery ball of polymeric product separated from the mixture. The polymer was washed several times with water, then it was dissolved in methylene chloride and the solution was washed with water. The polymer was precipitated by pouring the solution into excess methanol. After drying at 80° C. under reduced pressure, the polymer was a white, somewhat fibrous solid weighing 13.8 g., inherent viscosity=2.12 determined as previously described.

EXAMPLES 3–8

Variations of the solution reaction technique of Example 1 and the two phase interfacial reaction method described in Example 2 were run using the same reactants, proportions, and reaction conditions as described in those examples with exceptions as noted. The polysulfonates thereby obtained were subjected to various tests to determine their physical properties. The polymers of Examples 6–8 were endcapped by including a small molar proportion of phenol in the reaction solution so as to limit their molecular weight distribution. All property tests were run on samples compression molded at 200° C. except for the polymer product of Example 7 which was injection molded at 260° C. and 9000 p.s.i.

TABLE 1

| Example number | Method (S or IF) | Mole, percent phenol | Inherent viscosity | Tensile strength, p.s.i. | Tensile elastic modulus, 10⁵ p.s.i. | Vicat heat distortion temp., ° C |
|---|---|---|---|---|---|---|
| 2 | IF | 0 | 2.12 | | | |
| 3 [1] | IF | 0 | 1.58 | 11,292 | 3.58 | 147 |
| 4 [2] | IF | 0 | 1.63 | | | |
| 5 | S | 0 | 0.90 | 10,781 | 3.73 | 148 |
| 6 | S | 0.5 | 0.75 | 10,084 | 2.93 | 143 |
| 7 | S | 0.5 | 0.68 | 10,407 | 4.23 | 145 |
| 8 | S | 1.0 | 0.60 | | | |

[1] Example 3 was identical to Example 2 except for a 15 minutes addition time.
[2] In Example 4, the disulfonyl chloride was added to the bisphenol solution.

The polymer of Example 7 was also subjected to thermogravimetric analysis to determine its relative thermal stability. Heating was in air with a ten degree per minute heating rate. Temperatures at which the indicated percentage weight losses occurred are listed in Table 2.

TABLE 2

| Percent weight loss | 5 | 10 | 20 | 25 | 30 |
|---|---|---|---|---|---|
| Temperature, ° C | 390 | 403 | 420 | 430 | 452 |

By following the procedure described in Example 1 or Example 2, the disulfonyl chloride is reacted with equivalent quantities of other alkylidenebisphenols as defined above to obtain polysulfonates with physical properties very similar to those of the polymer products of those examples. Illustrative bisphenols which are used to replace Bisphenol A in the above examples include p,p'-sec-butylidenediphenol, p,p'-(3,3 - dimethyl-2-butylidene)diphenol, p,p'-(3-methyl-p-butylidene)diphenol, and p,p'-(5-methyl-2-hexylidene)diphenol. Preferably, these products are endcapped with phenol as in Examples 6–8 to obtain extrudable polymers.

I claim:

1. The polymer consisting essentially of repeating units having the formula

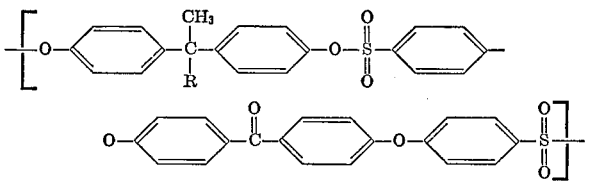

wherein R is an alkyl group of 1–6 carbon atoms.

2. The polymer of claim 1 wherein R is a methyl group.

3. The polymer of claim 1 wherein a portion of the polymer chains are capped with about 0.1–3 mole percent of the residue of a monohydric phenol based on the

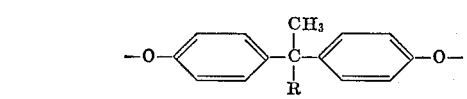

moieties present in the polymer chains.

4. The polymer of claim 5 wherein the monohydric phenol is phenol itself.

5. The polymer of claim 3 wherein R is a methyl group.

References Cited

UNITED STATES PATENTS

| 3,658,757 | 4/1972 | Conix et al. | 260—49 |
| 3,236,808 | 2/1966 | Goldberg et al. | 260—49 |
| 3,236,809 | 2/1966 | Goldberg et al. | 260—49 |
| 3,505,289 | 4/1970 | Conix et al. | 260—49 |

LESTER L. LEE, Primary Examiner

U.S. Cl. X.R.

260—33.8 R, 50